US008995829B2

(12) United States Patent
Barbieri et al.

(10) Patent No.: US 8,995,829 B2
(45) Date of Patent: Mar. 31, 2015

(54) OPTICAL LINK QUALITY MONITORING IN A COMPUTER NETWORK

(75) Inventors: Alessandro Barbieri, Santa Clara, CA (US); Marco Foschiano, Pinerolo (IT)

(73) Assignee: Cisco Technology, Inc., San Jose, CA (US)

( * ) Notice: Subject to any disclaimer, the term of this patent is extended or adjusted under 35 U.S.C. 154(b) by 982 days.

(21) Appl. No.: 11/758,407

(22) Filed: Jun. 5, 2007

(65) Prior Publication Data

US 2008/0304824 A1    Dec. 11, 2008

(51) Int. Cl.
| | |
|---|---|
| H04B 10/08 | (2006.01) |
| H04B 10/079 | (2013.01) |
| H04J 3/14 | (2006.01) |
| H04B 10/00 | (2013.01) |
| H04J 14/02 | (2006.01) |

(52) U.S. Cl.
CPC ...... H04B 10/0793 (2013.01); H04B 10/07955 (2013.01); H04J 3/14 (2013.01); H04J 14/0221 (2013.01)
USPC ............................................. 398/38; 398/25

(58) Field of Classification Search
CPC .............. H04J 14/0272; H04J 14/0275; H04J 14/0273; H04B 10/079; H04B 10/07955
USPC ......................... 398/38, 25, 37, 173, 177, 181
See application file for complete search history.

(56) References Cited

U.S. PATENT DOCUMENTS

| | | | |
|---|---|---|---|
| 6,574,226 B1 * | 6/2003 | Nakano et al. | 370/395.64 |
| 6,665,497 B1 | 12/2003 | Hamilton-Gahart et al. | |
| 6,765,659 B1 * | 7/2004 | Bhatnagar et al. | 356/73.1 |
| 6,950,865 B1 | 9/2005 | Depaolantonio | |
| 7,035,262 B1 | 4/2006 | Joshi | |
| 7,043,541 B1 | 5/2006 | Bechtolsheim et al. | |
| 7,103,149 B1 | 9/2006 | Depaolantonio | |
| 7,142,504 B1 | 11/2006 | Uzun | |
| 7,181,137 B1 | 2/2007 | Tamburello et al. | |

(Continued)

FOREIGN PATENT DOCUMENTS

| | | |
|---|---|---|
| WO | WO 2007/051843 | 5/2007 |
| WO | WO 2007051843 A1 * | 5/2007 |
| WO | WO 2008/150754 | 12/2008 |

OTHER PUBLICATIONS

SFF Committee; *SFF-8472 Specification for Diagnostic Monitoring Interface for Opti-cal Transceivers*; Rev 10.1; Mar. 1, 2007.

(Continued)

*Primary Examiner* — Daniel Dobson
(74) *Attorney, Agent, or Firm* — Novak Druce Connolly Bove + Quigg LLP

(57) ABSTRACT

In one embodiment, a local network device collects local optical power information for at least one of either a local optical transmit interface and a local optical receive interface of the local network device. The local network device may then exchange the local information for remote optical power information of corresponding remote optical receive and transmit interfaces of a remote network device at an opposing end of at least one corresponding optical link (fiber). For example, an exchange may use a point-to-point protocol which may dynamically determine/discover neighboring relationships between capable peer device interfaces and establish a suitable communication exchange between the capable peers. Based on the local information and exchanged remote information, the local network device may calculate an optical power loss of each corresponding optical link.

25 Claims, 6 Drawing Sheets

(56) References Cited

U.S. PATENT DOCUMENTS

| | | |
|---|---|---|
| 7,190,896 B1 * | 3/2007 | Wang et al. .................... 398/30 |
| 7,224,898 B1 | 5/2007 | Depaolantonio |
| 7,228,447 B1 | 6/2007 | Day |
| 2002/0030867 A1 | 3/2002 | Iannone et al. |
| 2002/0097463 A1 * | 7/2002 | Saunders et al. ............. 359/124 |
| 2003/0179701 A1 | 9/2003 | Saleh et al. |
| 2003/0179742 A1 * | 9/2003 | Ogier et al. .................. 370/351 |
| 2005/0010681 A1 | 1/2005 | Katukam et al. |
| 2005/0010849 A1 | 1/2005 | Ryle et al. |
| 2005/0111843 A1 * | 5/2005 | Takeuchi et al. ............... 398/38 |
| 2005/0209806 A1 | 9/2005 | Yoneyama |
| 2005/0216783 A1 | 9/2005 | Sundaram et al. |
| 2006/0002709 A1 * | 1/2006 | Dybsetter et al. ............ 398/135 |
| 2006/0044725 A1 | 3/2006 | Robinson et al. |
| 2006/0104641 A1 | 5/2006 | Casanova et al. |
| 2007/0217794 A1 * | 9/2007 | Sakamoto et al. ............ 398/177 |

OTHER PUBLICATIONS

PCT Notification of Transmittal of the International Search Report and the Written Opinion of the International Searching Authority, or the Declaration, International Application No. PCT/US2008/064829, Filing Date May 27, 2008; Date of Mailing: Sep. 5, 2008, 10 pages.

* cited by examiner

| FIELDS | | ENTRIES 350 |
|---|---|---|
| LOCAL TX OPTICAL POWER | 310 | TX_A |
| LOCAL RX OPTICAL POWER | 320 | RX_A |
| OTHER LOCAL PARAMETERS | 330 | OTHER_A |
| REMOTE TX OPTICAL POWER | 315 | TX_B |
| REMOTE RX OPTICAL POWER | 325 | RX_B |
| OTHER REMOTE PARAMETERS | 335 | OTHER_B |
| COMPUTED / CALCULATED VALUES | 340 | LINK LOSS; LENGTH; ETC. |

TABLE 300

FIG. 3

OPTICAL LINK QUALITY MONITORING IN A COMPUTER NETWORK

TECHNICAL FIELD

The present disclosure relates generally to computer networks, and, more particularly, to optical link quality monitoring in computer networks.

BACKGROUND

A computer network is a geographically distributed collection of nodes interconnected by communication links and segments for transporting data between end nodes, such as personal computers and workstations. Often, the communication links comprise an optical link/fiber medium that may be used to digitally transfer light (optical) signals between the nodes to thereby relay information between the nodes, such as for optical lightpaths, synchronous optical networks (SONET), etc., as will be understood by those skilled in the art. Accordingly, optical link troubleshooting and monitoring are significant aspects of many network operations (e.g., particularly for service provider "Metro Ethernet" designs in which long-haul connections are present). For example, when a computer network (or portions thereof) is originally established, a network administrator may wish to know the optical link/fiber characteristics, such as a distance/length of the fiber, optical power loss ("link loss") along the fiber, etc. Also, during operation of an optical network, problems may occur, such as communication failures/delays/etc. As such, it may be particularly beneficial to determine whether a problem is caused by a physical factor of the optical links (Layer-1), or by some other factor that is not physical, such as various protocol errors, software errors, applications errors, etc. (e.g., upper layers, Layer-2 through Layer-7, as will be understood by those skilled in the art.

Currently, various tools and mechanisms are available that may be used for optical link troubleshooting and monitoring. For instance, one set of tools currently available includes manual tools, such as an optical time domain reflectometer (OTDR). For example, an OTDR may be used by a technician to scan a fiber to determine its physical (optical) characteristics, such as link loss, locations of connectors/splices, length, etc. Such manual tools, however, are often expensive, require physical local access by a technician to use, and are not generally available in real-time at each location within the optical network. In other words, a technician needs to go to the site of the node, such as a network device, of interest for an original installation and/or in the event a problem occurs in order to diagnose any optical characteristics (which, notably, may have corrected themselves before the technician is able to reach the network device).

As another tool for monitoring and troubleshooting optical networks, certain networks may employ the use of a high-end (e.g., expensive) optical monitoring system that requires a centralized monitoring/supervisor system. For example, optical devices employed in conjunction with such systems may collect optical power information using a dedicated photo detector on the optical fibers (which "steals" light/power from the fibers), and may transmit this information to the centralized monitoring system. The centralized monitoring system processes the information received from the optical devices to, e.g., determine various optical quality parameters/characteristics generally used by network administrators for network management, maintenance, and configuration.

Each node or device within the optical network (that is, not including the centralized management system), however, is generally unable to compute optical quality parameters that require knowledge other than what may be measured on each device itself (e.g., its transmit power and its receive power for given fibers/links). As such, optical network devices are thus not conventionally configured to respond to optical (physical) quality parameters themselves. There remains a need, therefore, for an efficient technique for monitoring of optical characteristics, such as optical quality parameters and degradation, at each node within the optical network without the need for a centralized management system. In particular, there remains a need for such an optical monitoring technique that is dynamic, low cost, and available on-demand.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 illustrates an example table.

DESCRIPTION OF EXAMPLE EMBODIMENTS

Overview

According to embodiments of the disclosure, a local network device collects local optical power information for at least one of either a local optical transmit interface and a local optical receive interface of the device. The local network device may then exchange the local information for remote optical power information of corresponding remote optical receive and transmit interfaces of a remote network device located at an opposing end of at least one corresponding optical link (fiber). Based on the local information and exchanged remote information, the local network device may calculate an optical power loss of each corresponding optical link. Also, according to embodiments of the disclosure, based on the optical power loss, the local network device may calculate an approximate length of each optical link and an optical power margin (from an optical power budget), and may further generate history (for trend analysis) or errors (e.g., after exchanging calculated results with the remote network device), accordingly. In particular, in accordance with one or more embodiments, the optical information may be conveyed by a point-to-point protocol which may dynamically determine/discover neighboring relationships between capable peer device interfaces and establish a suitable communication exchange between the capable peers.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, etc. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by one or more intermediate network nodes, such as routers and/or switches, in order to extend the effective "size" of each network.

Figure 1:
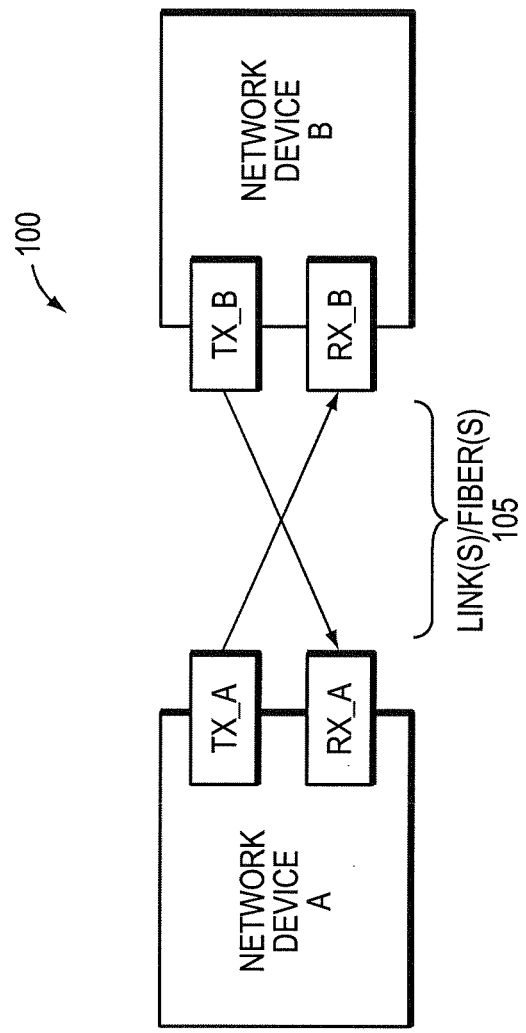
FIG. 1 illustrates an example computer network.

FIG. 1 is a schematic block diagram of an example computer network 100 illustratively comprising nodes/devices, such as optical network devices A and B, interconnected by links (e.g., optical fibers) 105 as shown. In particular, in an optical network, nodes may be illustratively interconnected from a transmit port/interface (e.g., TX_A of device A or TX_B of device B) to a receive port/interface (e.g., RX_B of device B or RX_A of device A, respectively) of a corresponding optical link. Those skilled in the art will understand that any number of nodes, devices, links, etc. may be used in the computer network, and that the view shown herein is for simplicity. Also, while the description herein describes two corresponding unidirectional links/fibers 105 for bidirectional communication between devices A and B, those skilled in the art may appreciate that a single bidirectional link/fiber 105 may be used, having a shared transmit and receive interface (e.g., TX/RX_A and TX/RX_B), such as for wavelength-division multiplexing (WDM), accordingly.

Data/information (e.g., packets/traffic sent between a client and server) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In particular, as described herein, such communications/exchanges may comprise optical signals relayed between the devices over optical links/fibers 105, accordingly.

Figure 2:
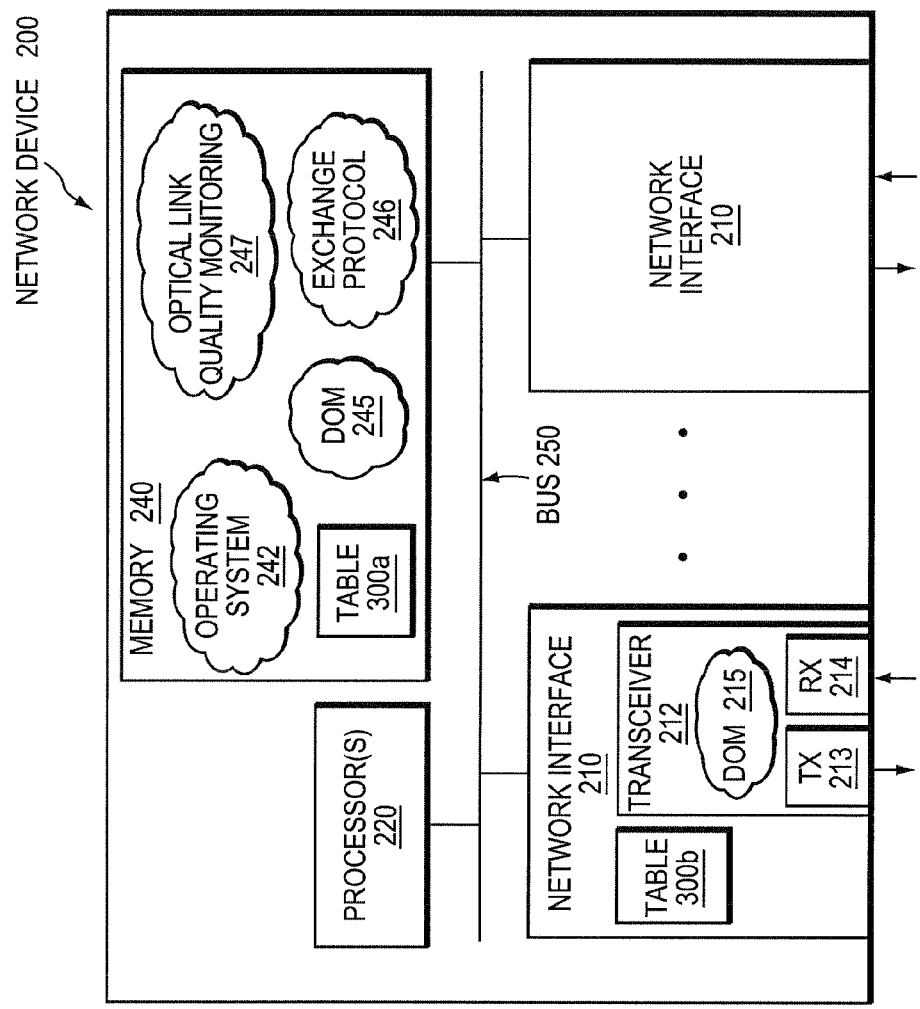
FIG. 2 illustrates an example network device/node.

FIG. 2 is a schematic block diagram of an example node/device 200 that may be advantageously used with one or more embodiments described herein, e.g., an optical network device A or B (for example, routers, switches, or other optical transport mechanisms). The device may comprise a plurality of network interfaces 210, one or more processors 220, and a memory 240 interconnected by a system bus 250. The network interfaces 210 contain the mechanical, electrical, and signaling circuitry for communicating data over physical links coupled to the network 100. Illustratively, the network interfaces may be configured to transmit and/or receive data using a variety of different communication protocols, including, inter alia, TCP/IP, UDP, ATM, SONET, SDH, Frame Relay, Ethernet, Fiber Distributed Data Interface (FDDI), etc. In particular, in accordance with one or more embodiments described herein (and as described below), interfaces 210 may comprise one or more optical transceivers 212, each with a transmit (TX) interface 213 and a receive (RX) interface 214. Also, the interfaces 210 may be configured to operate one or more optical measurement components, such as a digital optical monitoring (DOM) component 215, as well as one or more tables 300b in a localized storage location to be used to store the optical measurements, as described herein.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a table 300a. An operating system 242, portions of which are typically resident in memory 240 and executed by the processor(s), functionally organizes the node by, inter alia, invoking network operations in support of software processes and/or services executing on the device. These software processes and/or services may comprise DOM process/services 245, exchange protocol process/services 246, and illustrative optical link quality monitoring process/services 247, as described herein. It will be apparent to those skilled in the art that other processor and memory means, including various computer-readable media, may be used to store and execute program instructions pertaining to the inventive technique described herein.

Exchange protocol process/services 246 contain computer executable instructions executed by each processor 220 to perform functions provided by one or more exchange protocols (e.g., layer 2/3 protocols), such as the various communication protocols mentioned above and as will be understood by those skilled in the art. Also, DOM process/services 245 contain computer executable instructions executed by each processor 220 to perform functions relating to the measurement and collection of optical parameters/characteristics. Digital Optical Monitoring (DOM) is an industry-wide standard, known as "Digital Diagnostic Monitoring Interface for Optical Transceivers" (or SFF-8472 available at the filing of this application at ftp://ftp.seagate.com/sff/SFF-8472.PDF), intended to define a digital interface to access real-time transceiver operating parameters. For instance, such parameters may comprise optical transmit power, optical receive power, laser bias current, temperature, transceiver supply voltage, etc. Notably, the illustrative use of DOM capable devices is merely a representative example of a means for optical parameter monitoring. Those skilled in the art will appreciate that other means for obtaining optical parameters may be used in accordance with one or more embodiments of the present disclosure, accordingly.

As noted, optical link troubleshooting and monitoring are significant aspects of many network operations, such as to determine optical link/fiber characteristics, e.g., a distance/length, optical power loss ("link loss") along the fiber, etc., or to determine a cause of a problem (e.g., whether it is a physical or non-physical cause). Also, manual tools (e.g., OTDRs) and/or high-end centralized optical monitoring/management systems may be expensive and complex to implement, and often require on-site (local) execution. Further, each device within an optical network (that is, not including the centralized monitoring system), has conventionally been unable to compute optical quality parameters other that what may be measured on each device itself (e.g., DOM measured parameters/characteristics) or exchange this information with other devices/nodes (other than the centralized monitoring system).

Optical Link Quality Monitoring

According to embodiments of the disclosure, a local network device 200 (e.g., device A) collects local optical power information for at least one of either a local optical transmit interface (e.g., interface TX_A) and a local optical receive interface (e.g., RX_A) of the device. The local network device may then exchange the local information for remote optical power information of corresponding remote optical receive and transmit interfaces (e.g., interface RX_B and TX_A, respectively) of a remote network device (e.g., device B) located at an opposing end of at least one corresponding optical link (fiber) 105 (e.g., using a point-to-point protocol which may dynamically determine/discover neighboring relationships between capable peer device interfaces and establish a suitable communication exchange between the capable peers). Based on the local information and exchanged remote information, the local network device may calculate an optical power loss ("link loss") of the corresponding optical link(s). Also, according to embodiments of the disclosure, based on the optical power loss, the local network device may calculate an approximate length of each optical link 105 and an optical power margin (from an optical power budget), and may further generate history (for trend analysis) or errors (e.g., after exchanging calculated results with the remote network device), accordingly.

In an illustrative embodiment, optical link quality monitoring process/service 247 contains computer executable instructions executed by each processor 220 of the optical network device 200 to perform functions related to the novel techniques described herein, e.g., to provide optical link quality monitoring in a computer network. In particular, monitoring process/services 247 may operate in conjunction with DOM process/services 245 of the device 200 as well as DOM process/services 215 of each network interface 210 of the device to obtain the optical measurements, as will be appreciated by those skilled in the art. Notably, the novel techniques may be configured on a per-device basis (e.g., globally), or on a per-interface basis, such that only certain interfaces perform the functions described herein. Moreover, as described herein, the novel techniques may be performed in response to received triggers, such as from a user/administrator or dynamically generated ("received") triggers in response to occurrence of one or more configured events (such as link errors/failures, etc.). Also, triggers may be received from another interested device that sends a request, such as a peer (neighboring) optical network device, e.g., that is interested in computing results, as described below. Alternatively or in addition, the novel techniques may be performed in response to one or more periodic timers or other timer-based triggers.

Operationally, a local optical network device (e.g., device A) collects local optical power information for its interfaces (e.g., for TX_A and RX_A), such as through DOM 215/245 mentioned above. Also, a remote optical network device (e.g., device B) may similarly collect remote optical power information for its interfaces, e.g., for RX_B and TX_B (that is, its local information for its interfaces on the corresponding link/links). (Notably, as will be appreciated, from network device B's viewpoint, the local network device is device B itself and network device A is the remote network device.) The collected information may be obtained in response to the trigger to collect the information (e.g., on-demand), or may be continuously/periodically obtained and stored for retrieval as needed. For instance, the collected information may be stored locally to the collecting network device in a table 300b at the network interfaces 210, or in a centralized table 300a of the device 200 (e.g., to store collected information for all configured interfaces of the device). FIG. 3 illustrates an example table 300 for storing information in accordance with one or more embodiments described herein. Table 300 is illustratively stored in memory 240 and may include one or more entries 350, each comprising a plurality of fields for storing local transmit (TX) optical power 310, local receive (RX) optical power 320, and other local parameters 330 of a particular interface 210, remote transmit (TX) optical power 315, remote receive (RX) optical power 325, and other remote parameters 335 of a particular corresponding remote interface (described below), as well as computed/calculated values 340 (also described below). Notably, table 300 may comprise further entries 350 for additional interfaces/transceivers 210/212 (e.g., as central table 300a in memory 240), or may simply comprise entries 310, 320, and 330 for an interface-based table (300b at each interface 210), accordingly. Further, the table 300 is illustratively maintained and managed by DOM 215/245 and/or optical link quality monitoring process 247.

As an example, assume that local optical network device A collects information about its interface 210 corresponding to TX_A and RX_A. For instance, using conventional DOM (or other) techniques, device A may determine that:

Optical power at local TX_$A$=−1 dBm (decibel milliwatt); and

Optical power at local RX_$A$=−14 dBm.

As mentioned above, optical network device B may also locally collect its information for corresponding interfaces RX_B and TX_B, such that, for example:

Optical power at local (to $B$) TX_$B$=+2 dBm; and

Optical power at local (to $B$) RX_B=−17 dBm.

Once the information is collected (e.g., and stored in respective fields of entries 350 described above), the local network device A may exchange its local optical power information for remote optical power information of corresponding interfaces of remote network device B. That is, the devices exchange information for opposing ends of the same link/fiber 105, such as the transmit interface (TX_A) of the local device on the link, and a receive interface (RX_B) of the remote device on the other end of the same link (or RX_A and TX_B, accordingly).

Illustratively, the exchange protocol (e.g., maintained by exchange protocol process/services 246) may utilize a point-to-point transport protocol to exchange the local and remote information. In essence, a suitable protocol may be any protocol that has example characteristics of: i) a per-port message interval as low as one second, and as high as several hours; ii) the capability of requesting information about the neighboring (remote) device's interfaces; iii) basic authentication, sequence number, and integrity checking capabilities; and iv) retransmission capabilities in case of a loss of a message/packet due to cyclic redundancy check (CRC) errors or other errors. For example, various embodiments of generic Layer-2 control protocols may be suitable exchange protocols over transmission media such as, e.g., Ethernet, SONET, Packet over SONET (PoS), SDH, High-Level Data Link Control (HDLC); Point-to-Point Protocol (PPP), ATM, etc.

Layer-2 protocols may be particularly well suited for an exchange protocol as they enable an implementation to work with minimal configuration after initial establishment ("boot-up") of the device on the network. In other words, an exchange session may be initiated with a discovered optical neighbor to begin the exchange of information as described herein. Also, Layer-2 protocols generally operate on shared ports having direct optical link connections, and are close to the physical level (Layer-1), so they may be aware of the device and its physical interfaces on the opposing end of the connection. In particular, in accordance with one or more embodiments described herein, Layer-1 (physical) parameter-based optical analysis may be conveyed by a Layer-2 point-to-point protocol which dynamically determines/discovers neighboring relationships between pairs of capable interfaces. For instance, the Layer-2 protocol may establish a communication channel between the discovered peer devices (neighbors), and may initiate the exchange of information, accordingly. Further, the exchange protocol may be configured to detect when incompatible/unsuitable Layer-2 topologies are being used, such as, e.g., point-to-multipoint or capable-to-incapable connections, etc.

Notably, the exchange protocol may also be other protocols, such as suitable Layer-3 protocols (e.g., UDP, Interior Gateway Protocol, "IGP," Bidirectional Forwarding Detection, "BFD," etc.), or other out-of-band transport mechanism. The use of Layer-2 transport protocols, therefore, is merely an illustrative example. Further, it should be noted that because the exchange may generally be configured as a point-to-point exchange (i.e., strictly over an interface between two devices), the exchange is non-looping, and thus may be configured to bypass blocked ports, such as spanning tree protocol, "SPT" blocked ports, accordingly.

Figure 4:
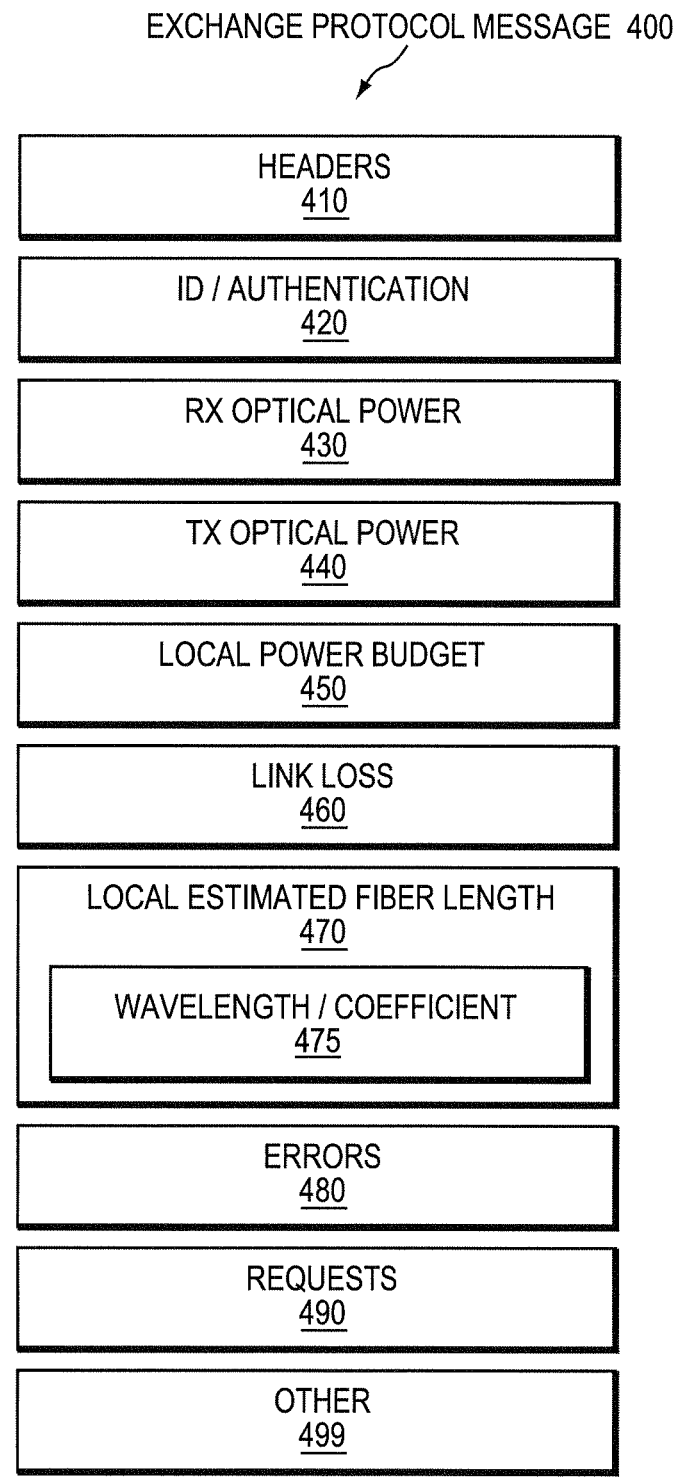
FIG. 4 illustrates an example exchange protocol message.

FIG. 4 illustrates an example exchange protocol message 400 that may be used in accordance with one or more embodiments described herein. For instance, message 400 may comprise a headers field 410, appropriate for operation with some connection encapsulation (e.g., IP headers, etc.) between the local and remote devices, as will be understood by those skilled in the art, as well as an identification (ID)/Authentication field 420, which may carry an ID of the device, a particular interface 210 (e.g., RX_A, TX_B, etc.), sequence numbers, checksums, etc.

An RX optical power field 430 and TX optical power field 440 may be adapted to carry receive and transmit power values (respectively) as measured by the respective sending device. For example, RX optical power field 430 sent from network device A may contain the value "−14 dBm," while TX optical power field 440 sent from network device B may contain the value "+2 dBm." Message 400 may comprise other fields, such as a local power budget field 450, a link loss field 460, a local estimated fiber length field 470 (and corresponding wavelength/coefficient field 475), and errors field 480, each of which is adapted to carry/transmit one or more values as needed and as described below. A requests field 490 may also be included within message 400 to transmit/relay particular requests between the devices (e.g., as one or more flags), such as for sending triggers requesting the other device's information (mentioned above), or other requests, e.g., as mentioned herein. Notably, an "other" field 499 may be adapted to contain information that may be useful to transmit between the two devices and that is not provided with a specifically mentioned field herein.

Illustratively, various fields of the message 400 may be embodied as a "TLV encoded format". In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields. TLVs may comprise one or more non-ordered sub-TLVs carried within a TLV "payload" (e.g. Value field), each having a Type, Length, and Value. Notably, other information may be contained within the Value (of the TLV and/or sub-TLV), such as, e.g., one or more flags. Also, while the fields of the message 400 have been shown in an illustrative order, those skilled in the art will appreciate that the order is merely an example, and that the fields of the message need not be presented in any particular order in accordance with one or more embodiments herein.

Continuing the example above, once the devices A and B have exchanged the information in messages 400 and appropriately populated fields (e.g., RX and TX optical powers 430 and 440), device A may learn of device B's remote (local to B) information. As such, device A may thus be aware from its perspective that:

Optical power at local TX_$A$=−1 dBm;

Optical power at local RX_$A$=−14 dBm;

Optical power at remote TX_$B$=+2 dBm; and

Optical power at remote RX_$B$=−17 dBm.

Note that after the exchange, device B should be aware of the same information with regards to its perspective of local/remote values (that is, the values with reversed local/remote perspectives), which have been omitted for clarity. Also, while in the example embodiment both the transmit and receive power values of a device are exchanged, the network devices may be configured to merely exchange one or the other value, such as informing the remote device of the transmit (TX) power only, such that the remote/receiving device may compute the link loss on its receive interface, accordingly.

Once the exchange of information is performed (e.g., and the information stored in table 300), the network devices may then calculate an optical power loss ("link loss") of at least one of the links/fibers 105 between the devices based on the local information and exchanged remote information. In particular, the optical power loss may be computed as the difference between the optical transmit power and the corresponding optical receive power on the other (opposing) ends of the same fiber/link. For example, network device A may compute:

Optical power loss of fiber/link from $B$ to $A$=Remote TX_$B$−Local RX_$A$=+2−(−14) 16 dBm; and Optical power loss of fiber/link from $A$ to $B$=Local TX_$A$−Remote RX_$B$=−1−(−17) 16 dBm.

In addition to calculating/computing the optical power loss (link loss) of a link, one or more embodiments described herein may utilize the optical power budget to additionally provide optical link quality monitoring functions/features. For instance, the network devices may compare the calculated power loss against a predetermined threshold, such as a minimum acceptable power budget value. An optical power budget value, that is, is generally based on an optical specification of the interface, i.e., the type of optical interfaces used on either end of the fiber 105. In particular, the optical power budget is the minimum transmit (TX) power of the transmitter on one end of the fiber, minus the minimum acceptable receive (RX) power on the opposing end of the fiber (i.e., the receiving device's "sensitivity"). In other words, the power budget is an indication (at a worst case scenario according to specifications) of the amount of optical power loss that may occur along the fiber. If the optical power loss becomes greater than the power budget, an error may be generated (which may either require different optical equipment or other action). Also, the network devices may calculate an optical power margin between the power budget and the calculated power loss, that is, an amount of additional link loss that may occur prior to surpassing the available power budget. (Notably, the optical power margin may also be computed as the receive (RX) power minus the minimum acceptable receive power, which may be used to confirm the power margin as computed above.)

Further, with the exchanged information and calculated optical power loss, the optical network devices may be configured to calculate an approximate length of the optical links/fibers 105. Illustratively, based on the optical power loss and a configured optical link/fiber attenuation coefficient, the network devices may calculate the inferred/estimated length of the fiber. For example, after determining a particular optical wavelength operating on a link of interest (e.g., by checking optic information programmed in the corresponding transceiver), the network device may determine an appropriate (e.g., configured/default) fiber attenuation coefficient, which represents an approximate loss based on distance, e.g., as determined by manufacturer's specifications, field testing, etc. For instance, a conventional fiber attenuation coefficient for an optical wavelength of 1550 nanometers (nm) is 0.25 dB/kilometer (dB/km), while at 1300 nm the attenuation coefficient may be 0.35 dB/km. As such, in the example above, the length of each link/fiber 105 may be estimated using the calculated power budget (16 dBm) and a determined wavelength (e.g., 1550 nm) having a correspondingly configured attenuation coefficient of 0.25 dB/km, i.e., 16/0.25=64 km of fiber between network devices A and B. Also, an optional coefficient may be applied to the length estimation in order to compensate for any supplementary estimated power losses, such as connectorization losses, losses from splicing and bends, passive device attenuations, etc., as may be appreciated by those skilled in the art. Notably, the length may be calculated from a single computed optical power budget value, or (as described further below) from an exponentially weighted moving average of link loss (e.g., when the average is stable for a predetermined length of time) to account for possible measurement oscillations.

Also, in accordance with one or more embodiments of the disclosure, various alarms and/or errors may be dynamically generated in response to the measurements and related calculated results. In particular, one benefit of the novel techniques described herein is their ability to dynamically detect problematic conditions without manual intervention and/or a centralized management/supervisory system. For instance, as mentioned above, the network devices may compare the calculated power loss against a minimum acceptable power budget value, and/or may determine whether the power margin is acceptable (e.g., non-negative or greater than a threshold), and may generate a warning/error if necessary. Other errors may be determined in response to any configurable policy, such as comparing the estimated length to an expected length (e.g., if they differ by a predetermined amount or fall outside of a valid range of lengths). In other words, any calculated/determined value that is outside of specification values ("out-of-spec") may be cause for generating an error (e.g., an alarm, warning, trap, log, etc.), accordingly.

In response to an error/alarm, each network device may be configured to operate in accordance with local policy, such as notifying an administrator, changing/deactivating links/fibers, updating routing tables, etc. In particular, each network device may be configured to notify the other (e.g., remote) network device of the particular error, such as though error fields 480 of messages 400. For example, various codes may be specified to indicate particular threshold violations, comparison errors, invalid data errors, etc. Illustratively, the error fields 480 may simply contain code values to indicate the type of error, or may also contain the actual erroneous values, such as an amount that a value is out-of-spec (e.g., dBm under the minimum receive power requirement, etc.). In this manner, if necessary, the remote device receiving the error messages may trigger remote alarms/actions in the event of abnormal/out-of-spec behavior (such as adjusting power levels, notifying appropriate administrators, etc.). Note that the error fields 480 of a message 400 may also be used to notify the remote device that the local device's interface is no longer in error.

In addition to exchanging measured values and errors, the peer/neighboring network devices (A and B) may also exchange the calculated/computed results, such as the optical power loss, power budgets, lengths, etc. That is, once the values have been computed, the exchange protocol established between the two devices may be configured to populate the appropriate fields in a returned message 400 to relay the computed information. For instance, local power budget field 450, link loss field 460, and local estimated fiber length field 470 may be used to inform the remote device of the locally computed values, respectively. Also, certain sub-fields (e.g., sub-TLVs) may be used to qualify the computed results, such as a corresponding wavelength/coefficient field 475 to inform the remote device of the wavelength and attenuation coefficient used to compute the length provided in length field 470. As such, the devices at both ends of the link/fiber are informed of the other end device's calculations. This received (remote) information may be used with the local information for comparisons/checks. For instance, if the calculated power budgets, link losses, and/or estimated fiber lengths that have been computed by each device differ more than a predetermined amount (e.g., 10%), then an error may be generated accordingly. This additional exchange capability may be used to detect calculation errors on a network device, or to highlight certain link imbalances (such as greater loss in one direction on the fiber, etc.).

In accordance with one or more embodiments of the disclosure, the optical network devices may further be configured to collect history regarding the measured optical power levels, as well as the calculated optical power loss and/or the computed results derived from the optical power loss (e.g., length, etc.). In this manner, the device may generate trend analysis based on the history (e.g., as stored in table 300 or otherwise in memory 240). For instance, the network device may estimate with a statistical analysis any link/signal degradation over time by monitoring link loss variations to determine whether the values are approaching an out-of-spec state, such that the calculated power margin is approaching unacceptable levels. Further, by collecting history, the network devices may be able to compute exponentially-weighted moving averages (EMA) of computed values (e.g., link loss), and may use these averages for error detection/reporting, accordingly. For instance, the local optical network device may calculate the link loss every predetermined time period (e.g., once every hour), and may also calculate the EMA of the last N recorded link loss values. If the immediate link loss or the EMA of link losses is above a certain (e.g., respective) threshold, an error may be generated accordingly. Also, if the rate at which the link loss is increasing is greater than a predetermined degradation rate, an error may be generated. In addition, other correlating factors may be considered during error detection in accordance with one or more embodiments herein, such as correlating transmission errors (such as CRC and alignment errors) with link loss variations. That is, by correlating interface errors and link loss readings, the network devices may be able to provide a statistical estimation of the optical link quality over time, and may predict a deterioration rate of transmission.

Figure 5:
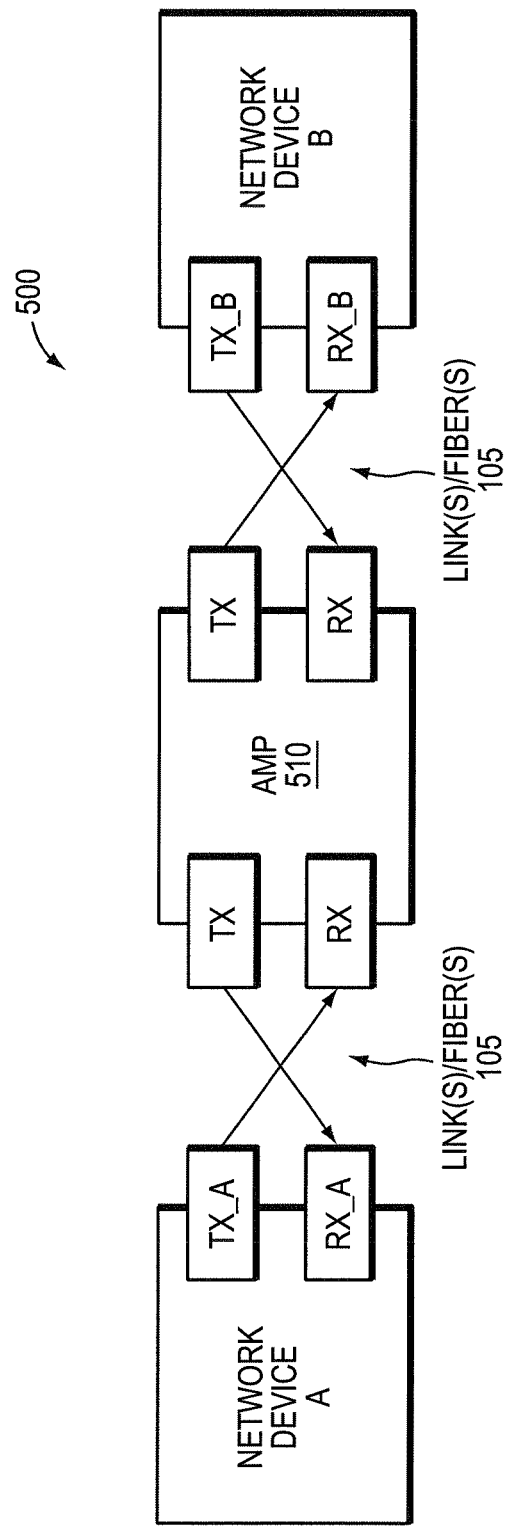
FIG. 5 illustrates an example computer network with an amplifier.

Notably, there are network configurations where the two network devices A and B are separated by one or more other nodes or intermediate network devices, such as physical layer (Layer-1) devices (e.g., optical amplifiers, etc.). For example, FIG. 5 illustrates a computer network 500 having network devices A and B from FIG. 1 above, but now separated by an illustrative optical amplifier 510 (e.g., with amplifier transmit and receive interfaces), as will be understood by those skilled in the art. Generally, the addition of an optical amplifier may render optical measurements less accurate/meaningful, as it may be difficult to determine the actual power loss at the amplifier. In particular, certain results derived from the measurements, such as length, may be too inaccurate to be worth computing. According to one or more embodiments of the disclosure, however, it may be possible that the remote network device is an optical amplifier between the local network device and another remote network device. In other words, the amplifier 510 may be configured with enough intelligence to monitor optical link quality, such as DOM-capable interfaces and a monitoring process 247, as well as a shared exchange protocol 246 (e.g., Layer-2). As such, the remote device (or local device) as described above may actually be an amplifier if so configured. Accordingly, the amplifier may further be configured to relay information (measurements, results, errors, etc.) to the other remote device, e.g., information computed/collected between the amplifier and device A may be communicated with device B (and vice versa).

Figure 6:
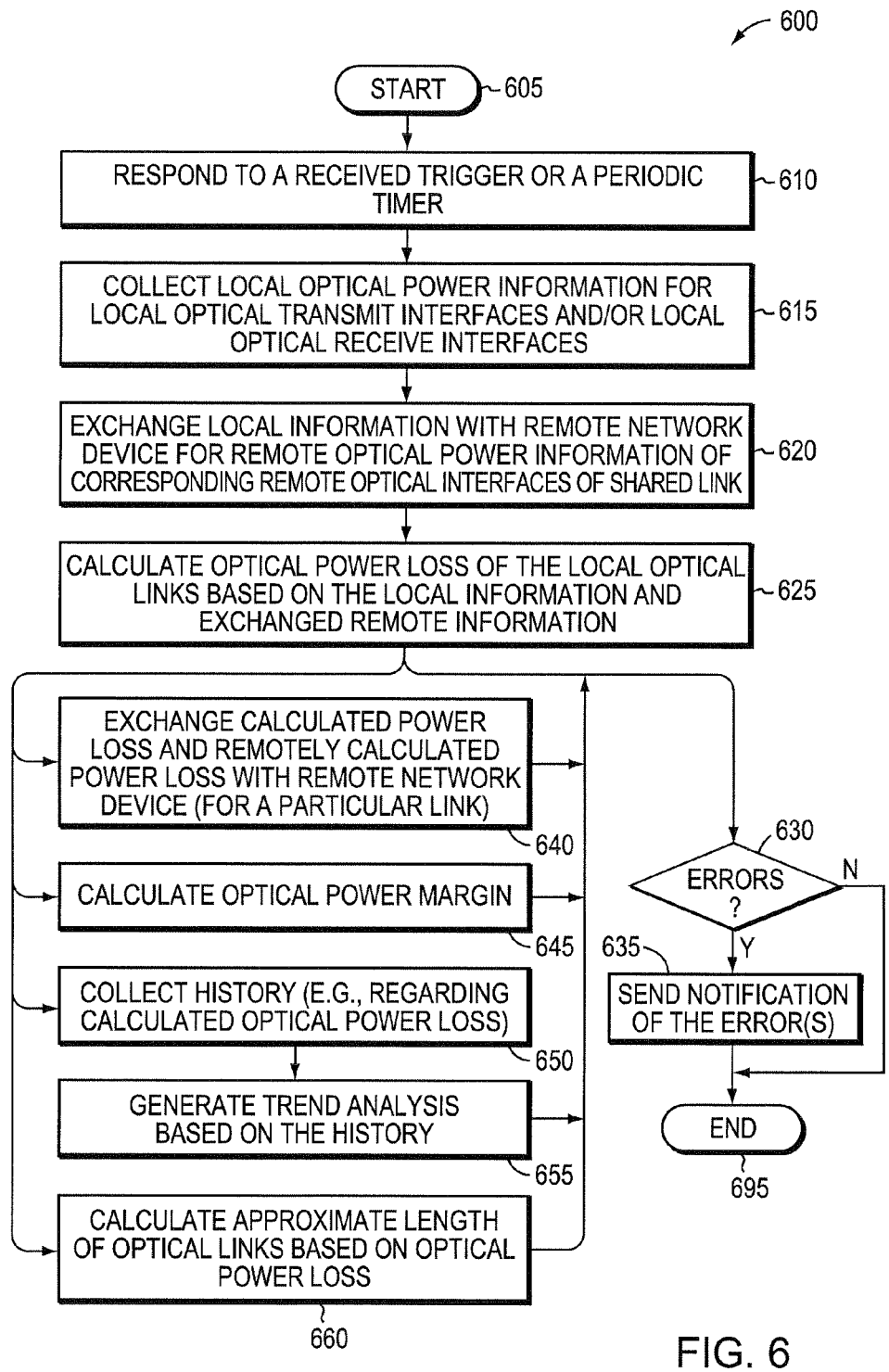
FIG. 6 illustrates an example procedure for monitoring optical link quality in accordance with one or more embodiments of the disclosure.

FIG. 6 illustrates an example procedure for monitoring optical link quality in accordance with one or more embodiments described herein. The procedure 600 starts at step 605, and continues to step 610, where a (local) network device (e.g., A) responds to a received trigger or a periodic timer, as mentioned above. Accordingly, in step 615, the network device A (e.g., optical link quality monitoring process 247) may collect local optical power information for local optical transmit interfaces (e.g., TX_A) and/or local optical receive interfaces (e.g., RX_A), e.g., using DOM (215/245). The local network device may exchange with a remote network device (e.g., B) the local information for remote optical power information of corresponding remote optical interfaces of a shared link/fiber 105 (e.g., RX_B and TX_B, respectively) in step 620. Based on the local information and exchanged remote information, the optical power loss (link loss) of the local optical links may be calculated in step 625. Notably, if at this point there are any errors (step 630), such as surpassed thresholds (out-of-spec), etc., the network device may send a notification of the error in step 635, e.g., to an administrator, the remote network device, etc., as described above.

Once the optical power loss is calculated in step 625, the network device may perform one of many additional operations as mentioned above (or may not, and the procedure 600 may end in step 695). In particular, in step 640, the local network device A may exchange the calculated power loss and remotely calculated power loss with remote network device B (e.g., for a particular link or links, such as the TX_A-RX_B link). If there are any errors determined in step 630 after the exchange, such as calculated power losses that don't match, a notification may be generated/sent in step 635. Otherwise, the procedure ends in step 695.

Alternatively or in addition, the local network device A may calculate an optical power margin in step 645, such as the difference between a minimum acceptable receive power and the measured receive power, and/or the difference between the calculated power loss and the link loss, as mentioned above. Again, there may be errors in step 630, such as a margin that is too small or incorrect (e.g., an invalid value), or the procedure may end in step 695.

Also, the network device may collect history in step 650, e.g., regarding a plurality of calculated optical power losses and errors (e.g., CRC errors) over time, and may generate trend analysis based on the history in step 655, which may also be exchanged with the remote device (described above). If any errors are predicted or otherwise determined (step 630) as described above, the network device may send a notification in step 635, accordingly.

Further, in step 660, the network device may calculate approximate lengths of local optical links based on the optical power loss, such as through attenuation coefficients as mentioned above. Each length may be compared against an expected value or against other specifications (e.g., a certain limited range of fiber/link lengths), and if any errors occur in step 630, a notification may be sent (step 635) or the procedure may end (step 695). If there are no errors, here or above, the procedure 600 ends in step 695, i.e., with the calculated optical power loss, and optionally with any of the additionally computed/calculated/exchanged/compared values mentioned herein.

Advantageously, the novel techniques described herein monitor optical link quality in a computer network. By communicating the collected optical power information between neighboring devices, the novel techniques provide the network devices with the ability to perform efficient up-to-date metering of optical link quality, without the need of a centralized monitoring system. In particular, the techniques described above may be used to monitor and detect transmission degradation and link imbalances, for instance, prior to a failure of the link, thus providing predictive monitoring capabilities. Further, the techniques may be implemented on any optical device with the ability to measure optical power information, and may be configured to monitor/compute the quality dynamically and/or in response to a manual trigger (e.g., without delay as soon as requested).

In addition, the novel techniques advantageously allow for easy deployment, troubleshooting, and monitoring of pluggable optics, as well as accelerated device/link installations (e.g., "plug-and-play" devices). Also, the optical link quality monitoring/management described above is particularly advantageous for Ethernet switched networks, where traditionally Ethernet does not offer any Layer-1 network monitoring functionality, as may be appreciated by those skilled in the art (e.g., unlike SONET/SDH). Moreover, the techniques described above allow for an inexpensive (e.g., generally not requiring extra equipment) and "in-service" monitoring and troubleshooting infrastructure (i.e., where "in-service" implies that a link/fiber need not be disconnected to inspect the fiber or optics/laser, unlike an OTDR or other optical power meter).

While there have been shown and described illustrative embodiments that monitor optical link quality in a computer network, it is to be understood that various other adaptations and modifications may be made within the spirit and scope of the present invention. For example, the embodiments have been shown and described herein using certain measurement techniques and communication protocols. However, the embodiments of the invention in their broader sense are not so limited, and may, in fact, be used with other measurement techniques and protocols. Also, while the above description describes optical measurements for optical fibers/links, other measurements for other types of communication mediums may be used in accordance with the teachings described herein. For instance, in addition to optical parameters, other parameter measurement and analysis may be provided and used in accordance to one or more embodiments, such as various electrical, mechanical, and/or thermal parameters.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    collecting Layer-1 parameters including local optical power information at a local network device for a local optical transmit interface of the local network device;
    dynamically determining a neighbor relationship with a remote network device accessible via the local optical transmit interface using a Layer-2 or Layer-3 exchange protocol;
    in response to the dynamically determining, sending an exchange protocol message from the local network device using a the Layer-2 or Layer-3 exchange protocol, the sent exchange protocol message having the Layer-1 parameters including the local optical power information for the local optical transmit interface of the local network device;
    receiving an exchange protocol message at the local network device via the Layer-2 or Layer-3 exchange protocol, the received exchange protocol message having Layer-1 parameters including remote optical power information of a corresponding remote optical receive interface of a remote network device at an opposing end of a corresponding optical link; and
    calculating an optical power loss of the corresponding optical link at the local network device, based on the local optical power information and the remote optical power information.

2. The method as in claim 1, further comprising:
    calculating an approximate length of a particular optical link based on the optical power loss of the particular optical link.

3. The method as in claim 2, further comprising:
    calculating the approximate length based on the optical power loss and a configured optical link attenuation coefficient.

4. The method as in claim 3, wherein the configured optical link attenuation coefficient is based on an optical wavelength on the particular optical link.

5. The method as in claim 1, wherein the Layer-2 or Layer-3 exchange protocol is a point-to-point transport protocol.

6. The method as in claim 1, further comprising:
    discovering neighboring relationships between capable interfaces of the local and remote network devices;
    establishing a communication exchange using the Layer-2 or Layer-3 exchange protocol between the capable interfaces of the local and remote network devices; and
    exchanging the Layer-1 parameters including the local optical power information and the Layer-1 parameters including the remote optical power information over the communication exchange established using the exchange protocol.

7. The method as in claim 1, further comprising:
    collecting the Layer-1 parameters including the local optical power information using Digital Optical Monitoring (DOM).

8. The method as in claim 1, further comprising:
    determining a power budget for the optical link; and
    calculating an optical power margin between the optical power loss and the power budget for the optical link.

9. The method as in claim 8, further comprising:
    determining an error if the calculated power margin is below a minimum acceptable power margin value.

10. The method as in claim 9, further comprising:
    notifying the remote network device of the error.

11. The method as in claim 1, further comprising:
    exchanging, for a particular link, the calculated power loss and a remotely calculated power loss with the remote network device.

12. The method as in claim 11, further comprising:
    generating an error in response to the calculated power losses differing by greater than a predetermined amount.

13. The method as in claim 1, further comprising:
    performing the steps of collecting, sending, and calculating in response to a received trigger.

14. The method as in claim 1, further comprising:
    performing the steps of collecting, sending, and calculating in response to a periodic timer.

15. The method as in claim 1, further comprising:
    collecting history regarding the calculated optical power loss for the optical link.

16. The method as in claim 15, further comprising:
    generating trend analysis based on the history.

17. The method as in claim 15, further comprising:
    collecting history regarding transmission errors on the optical link; and
    correlating the optical power loss history with the transmission error history.

18. The method as in claim 1, wherein the remote device is an optical amplifier between the local network device and another remote network device.

19. The method as in claim 1, wherein the Layer-2 or Layer-3 exchange protocol is a Layer-2 protocol or a Layer-3 protocol that has one or more of: i) a capability of requesting information about neighboring device's interfaces, ii) authentication, sequence number and integrity checking capabilities, and iii) retransmission capabilities in the event of message loss.

20. A node, comprising:
    one or more optical network transmit interfaces configured to transmit optical signals to a remote network device over a corresponding optical link;
    one or more optical network receive interfaces configured to receive optical signals from the remote network device over a corresponding optical link;
    one or more processors coupled to the optical network interfaces and configured to execute one or more processes; and
    a memory configured to store an optical link quality monitoring process executable by each processor, the optical link quality monitoring process when executed operable to: i) collect Layer-1 parameters including local optical power information for a transmit interface, ii) dynamically determine a neighbor relationship with a remote network device accessible via the transmit interface using a Layer-2 or Layer-3 exchange protocol, iii) send an exchange protocol message having the Layer-1 parameters including the local optical power information for the transmit interface using the Layer-2 or Layer-3 exchange protocol, iv) receive Layer-1 parameters including remote optical power information collected at the remote network device for a corresponding remote interface at an opposing end of a corresponding optical link via the Layer-2 or Layer-3 exchange protocol; and v) calculate an optical power loss of the corresponding optical link based on the local optical power information and the remote optical power information.

21. The node as in claim 20, wherein the optical link quality monitoring process, when executed, is further operable to:
calculate an approximate length of a particular optical link based on the optical power loss of the particular optical link.

22. The node as in claim 20, wherein the Layer-2 or Layer-3 exchange protocol is a point-to-point transport protocol.

23. The node as in claim 20, wherein the optical link quality monitoring process, when executed, is further operable to:
discover a neighboring relationship between the node and the remote network device;
establish a communication exchange using the Layer-2 or Layer-3 exchange protocol between the node and the remote network device; and
send the exchange protocol message having Layer-1 parameters including the local optical power information for the transmit interface, and receive the Layer-1 parameters having the remote optical power information collected at the remote network device, in the communication exchange between the node and the remote network device established using the Layer-2 or Layer-3 exchange protocol.

24. The node as in claim 20, wherein the Layer-2 or Layer-3 exchange protocol is a Layer-2 protocol or a Layer-3 protocol that has one or more of: i) a capability of requesting information about neighboring device's interfaces, ii) authentication, sequence number and integrity checking capabilities, and iii) retransmission capabilities in the event of message loss.

25. An apparatus, comprising:
means for collecting Layer-1 parameters including local optical power information at a local network device for a local optical transmit interface of the local network device;
means for dynamically determining a neighbor relationship with a remote network device accessible via the transmit interface using a Layer-2 or Layer-3 exchange protocol;
means for, in response to dynamically determining the neighbor relationship with the remote network, sending an exchange protocol message formatted according to the Layer-2 or Layer-3 exchange protocol having the Layer-1 parameters including the local optical power information for the local optical transmit interface of the local network device;
means for receiving an exchange protocol message formatted according to the Layer-2 or Layer-3 exchange protocol having Layer-1 parameters including remote optical power information of a corresponding remote optical receive interface of a remote network device at an opposing end of a corresponding optical link; and
means for calculating an optical power loss of the corresponding optical link at the apparatus, based on the local optical power information and remote optical power information.

* * * * *